US009143523B2

(12) United States Patent
Evrard (10) Patent No.: US 9,143,523 B2
(45) Date of Patent: Sep. 22, 2015

(54) ASSESSING THREAT TO AT LEAST ONE COMPUTER NETWORK

(75) Inventor: Phillipe Evrard, Dion Valmont (BE)

(73) Assignee: Phillip King-Wilson, Wesley Chapel, FL (US)

( * ) Notice: Subject to any disclaimer, the term of this patent is extended or adjusted under 35 U.S.C. 154(b) by 403 days.

(21) Appl. No.: 12/811,208

(22) PCT Filed: Dec. 31, 2007

(86) PCT No.: PCT/EP2007/064650
§ 371 (c)(1),
(2), (4) Date: Sep. 1, 2010

(87) PCT Pub. No.: WO2009/083036
PCT Pub. Date: Jul. 9, 2009

(65) Prior Publication Data
US 2010/0325731 A1 Dec. 23, 2010

(51) Int. Cl.
*G06F 11/00* (2006.01)
*H04L 29/06* (2006.01)
(Continued)

(52) U.S. Cl.
CPC .......... *H04L 63/1433* (2013.01); *G06F 21/577* (2013.01); *G06F 2221/2101* (2013.01)

(58) Field of Classification Search
CPC ....... G06F 21/577; G06F 21/56; G06F 11/34; H04L 29/06877; H04L 29/06897; H04L 29/06904; H04L 29/06918; H04L 63/14; H04L 63/1425; H04L 63/1433; H04L 63/145
USPC .......................................................... 726/25
See application file for complete search history.

(56) References Cited

U.S. PATENT DOCUMENTS 6,742,128 B1 * 5/2004 Joiner .............................. 726/25
7,409,716 B2 8/2008 Barnett et al.
(Continued)

FOREIGN PATENT DOCUMENTS

EP 1768045 3/2007

OTHER PUBLICATIONS

Apostolakis, George et al. "A Screening Methodology for the Identification and Ranking of Infrastructure Vulnerabilities Due to Terrorism" Risk Analysis, Plenum Press, New York, New York, US, vol. 25, No. 2, Apr. 1, 2005, pp. 361-376.
(Continued)

*Primary Examiner* — Linglan Edwards
*Assistant Examiner* — Gary Garcia (57) ABSTRACT

Apparatus for assessing threat to at least one computer network in which a plurality of systems ($30_1$, $30_2$, $30_3$, $30_4$, $30_5$, . . . $30_n$) operate is configured to determine predicted threat activity (13), to determine expected downtime of each system in dependence upon said predicted threat activity, to determine loss ($12_A$, $12_B$, $12_C$, $12_D$, $12_E$, . . . , $12_m$) for each of a plurality of operational processes ($31_A$, $31_B$, $31_C$, $31_D$, $31_E$, . . . $31_m$) dependent on the downtimes of the systems, to add losses for the plurality of processes so as to obtain a combined loss ($12_{SUM}$) arising from the threat activity.

15 Claims, 8 Drawing Sheets

(51) Int. Cl.
*G06F 21/57* (2013.01)
*G06F 12/14* (2006.01)

(56) References Cited

U.S. PATENT DOCUMENTS

| | | | |
|---|---|---|---|
| 7,818,797 B1* | 10/2010 | Fan et al. | 726/22 |
| 2002/0188870 A1 | 12/2002 | Gong et al. | |
| 2003/0084349 A1 | 5/2003 | Friedrichs et al. | |
| 2003/0110396 A1* | 6/2003 | Lewis et al. | 713/201 |
| 2003/0154393 A1 | 8/2003 | Young | |
| 2004/0064543 A1* | 4/2004 | Ashutosh et al. | 709/224 |
| 2004/0260947 A1* | 12/2004 | Brady et al. | 713/201 |
| 2005/0066195 A1 | 3/2005 | Jones | |
| 2005/0278786 A1* | 12/2005 | Tippett et al. | 726/25 |
| 2005/0289649 A1* | 12/2005 | Mitomo et al. | 726/22 |
| 2006/0021050 A1* | 1/2006 | Cook et al. | 726/25 |
| 2006/0106797 A1* | 5/2006 | Srinivasa et al. | 707/6 |
| 2006/0218640 A1* | 9/2006 | Lotem et al. | 726/25 |
| 2007/0011722 A1* | 1/2007 | Hoffman et al. | 726/3 |
| 2007/0016955 A1* | 1/2007 | Goldberg et al. | 726/25 |
| 2007/0043656 A1* | 2/2007 | Lancaster | 705/38 |
| 2007/0067847 A1* | 3/2007 | Wiemer et al. | 726/25 |
| 2007/0113281 A1* | 5/2007 | Leach | 726/22 |
| 2007/0169194 A1* | 7/2007 | Church et al. | 726/23 |
| 2007/0186282 A1* | 8/2007 | Jenkins | 726/22 |
| 2007/0194097 A1* | 8/2007 | Jones et al. | 235/375 |
| 2007/0226796 A1* | 9/2007 | Gilbert et al. | 726/22 |
| 2007/0294766 A1* | 12/2007 | Mir et al. | 726/23 |
| 2008/0008085 A1* | 1/2008 | Gerstel | 370/216 |
| 2008/0082380 A1* | 4/2008 | Stephenson | 705/7 |
| 2008/0115221 A1* | 5/2008 | Yun et al. | 726/25 |
| 2008/0229420 A1* | 9/2008 | Jeschke et al. | 726/25 |
| 2008/0300837 A1* | 12/2008 | Buco et al. | 703/6 |
| 2009/0024627 A1* | 1/2009 | King | 707/9 |
| 2009/0030751 A1* | 1/2009 | Barve et al. | 705/7 |
| 2009/0204471 A1 | 8/2009 | Elenbass et al. | |
| 2010/0325731 A1 | 12/2010 | Evrard | |

OTHER PUBLICATIONS

International Search Report, mailed on Jun. 10, 2008, for PCT International Application No. PCT/EP2007/064650, filed on Dec. 31, 2007.

Written Opinion, mailed on Jun. 10, 2008, for PCT International Application No. PCT/EP2007/064650, filed on Dec. 31, 2007.

* cited by examiner

ASSESSING THREAT TO AT LEAST ONE COMPUTER NETWORK

FIELD OF THE INVENTION

The present invention relates to apparatus for and a method of assessing threat to at least one computer network.

BACKGROUND ART

Large organizations, such as international banks and other financial institutions, rely heavily on their computer systems to carry out their business operations. Increasingly, organizations are connecting their networks to public networks, such as the Internet, to allow them to communicate with their customers and other organizations. However, in doing so, they open up their networks to a wider range and greater number of electronic threats, such as computer viruses, Trojan horses, computer worms, hacking and denial-of-service attacks.

To respond to these forms of threat, organizations can implement procedures, tools and countermeasures for providing network security. For example, they can install intrusion detection and prevention systems to protect their network. However, even if these security systems are properly managed and well maintained, their network may still be vulnerable to threat. Furthermore, their network may also be vulnerable to other, non-electronic forms of threat, such as fire, flood or terrorism.

The present invention seeks to provide apparatus for and a method of assessing threat to a computer network or computer networks.

SUMMARY OF THE INVENTION

According to the present invention there is provided apparatus for assessing threat to at least one computer network in which a plurality of systems operate, the apparatus configured to determine predicted threat activity, to determine expected downtime of each system in dependence upon said predicted threat activity, to determine loss for each of a plurality of operational processes dependent on the downtimes of the systems, to add losses for the plurality of processes so as to obtain a combined loss arising from the threat activity.

The apparatus may comprise a first module configured to determine the predicted threat activity, a second module configured to determine the expected downtime of each system and a third module configured to determine the loss for each of a plurality of operational processes. The third module may be configured to add the losses for the plurality of processes.

The apparatus may be configured to store at least one of the losses and the combined loss in a storage device. The apparatus may be configured to display at least one of the losses and the combined loss on a display device.

The apparatus may be further configured to output the predicted threat activity to a firewall.

The loss may be value at risk.

The apparatus may be configured to retrieve a list of observed threats and to determine the predicted threat activity based upon the list of observed threats.

The observed list of threats may include, for each threat, information identifying at least one system. The observed list of threats may include, for each threat, information identifying frequency of occurrence of the threat. The frequency of occurrence of the threat may include at least one period of time and corresponding frequency of occurrence for the at least one period of time.

The plurality of systems may include a plurality of software systems

According to a second aspect of the present invention there is provided a method of assessing threat to at least one computer network in which a plurality of system operate, the method comprising determining predicted threat activity, determining expected downtime of each system in dependence upon said predicted threat activity, determining loss for each of a plurality of operational processes dependent on the downtimes of the systems, adding losses for the plurality of processes to obtain a combined loss arising from the threat activity.

The method may further comprise storing at least one of the losses and combined loss in a storage device. The method may further comprise displaying at least one of the losses and combined loss on a display device.

According to a third aspect of the present invention there is provided a computer program, which, when executed by a computer system, causes the computer system to perform the method.

According to a fourth aspect of the present invention there is provided a computer readable medium storing the computer program.

BRIEF DESCRIPTION OF THE DRAWINGS

Embodiments of the present invention will now be described, by way of example, with reference to the accompanying drawings in which.

DETAILED DESCRIPTION OF EMBODIMENTS OF THE INVENTION

Figure 1:
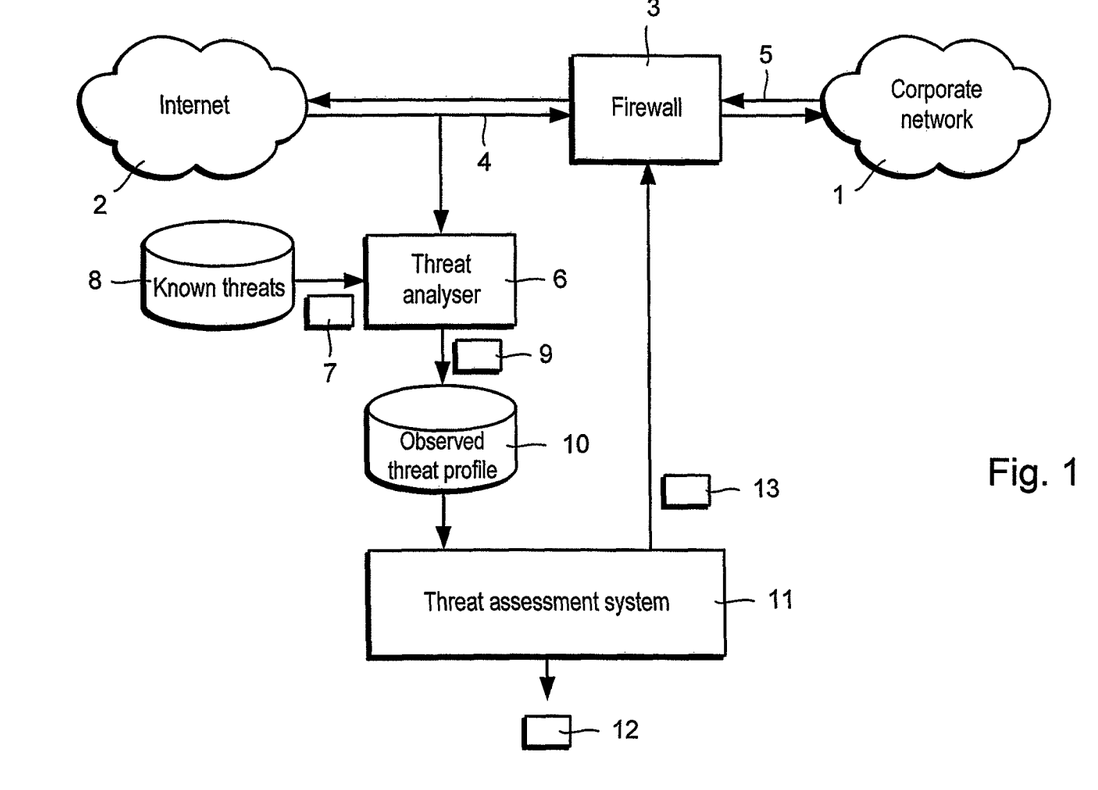
FIG. 1 is a schematic diagram of two computer networks connected via a firewall, a system for analysing network traffic and a system for assessing threat in one of the computer networks.

Referring to FIG. 1, a corporate network 1 is connected to an external network 2, in this case the Internet, via a firewall 3. The firewall 3 filters incoming traffic 4 from the Internet and, optionally, outgoing traffic 5, according to a security policy (not shown). The corporate network 1 may be provided a single, private network. The network 1 need not be a corporate network, but can be a government, academic, military or other form of private network. The network 1 may include a plurality of interconnected networks, for example which are geographically distributed.

The Internet 2 is a source of electronic threat, such as computer viruses (herein referred to simply as "viruses"), Trojan horses ("Trojans"), computer worms ("worms"), hacking and denial-of-service attacks. If a threat enters the corporate network 1 and is not stopped, then it can cause damage within the corporate network 1. For example, a virus may infect information technology (IT) systems 30 (FIG. 3) within the corporate network 1 resulting in the loss of one or more operational processes 31 (FIG. 3), for example a business process, either as a direct result of infection and/or as a result of measures taken to remove the virus from the infected system. Loss can also occur as the result of other forms of attack, such as hacking and denial-of-service attacks.

An IT system may be or include software, such as an operating system, an application or a combination of operating system and application(s). An IT system may be or include hardware, such as server(s), storage, network connections or a combination of one or more hardware elements. As will be explained in more detail later, some types of threat, such as virus, may affect software, and other types of threat, such as fire, may affect hardware and/or software. An IT system can be treated, for the purposes of assessing threats, as a combination of software and hardware.

Figure 3:
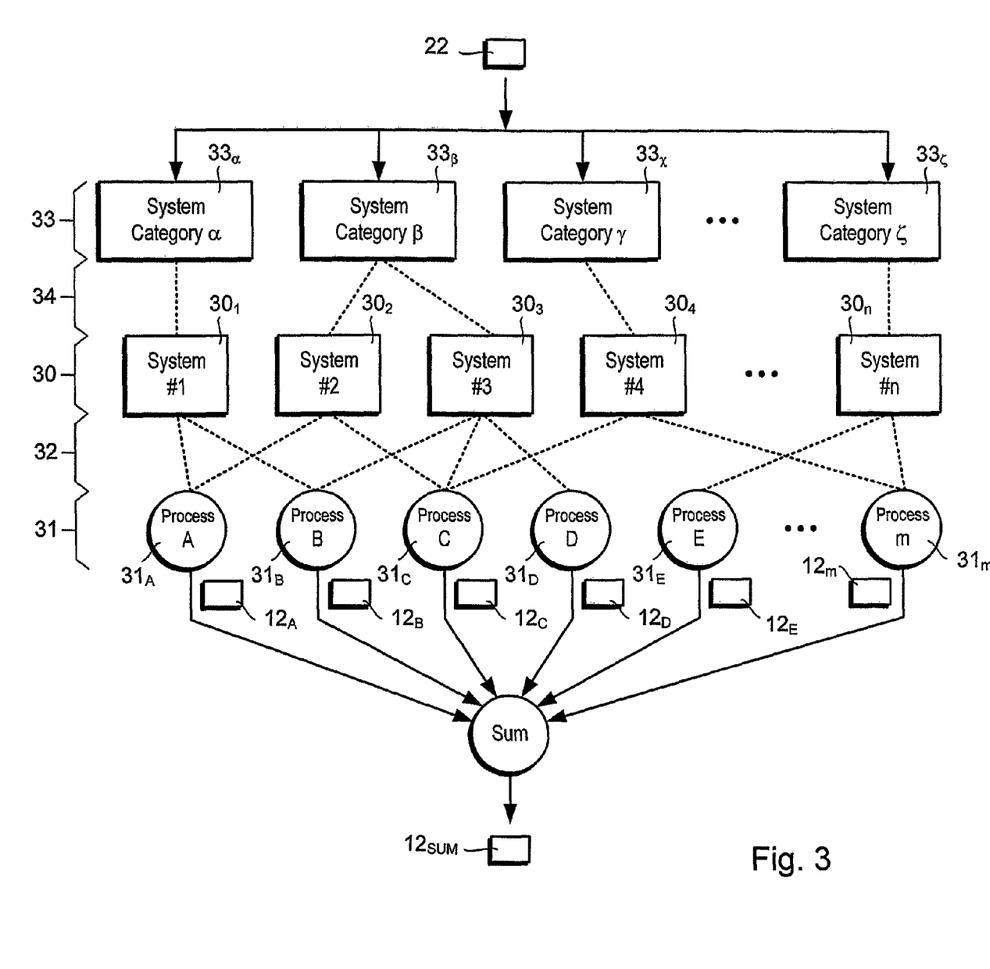
FIG. 3 illustrates calculation of loss arising from predicted threat.

The degree to which an organisation will be affected by a successful attack depends on a number of factors, such as the number of IT systems 30 (FIG. 3) affected by the attack and the number of operational processes 31 (FIG. 3) relying on the affected IT systems 30 (FIG. 3).

If the likelihood of an attack succeeding can be estimated for a number of different threats, then this can be combined with knowledge of the logical structure of IT systems 30 (FIG. 3) within the network 1 and knowledge of processes 31 (FIG. 3) dependent on those IT systems 30 (FIG. 3) to predict, for a given period of time, loss to the organisation due to these threats. In some embodiments, the predicted loss is expressed as a value at risk (VAR). However, the prediction may be expressed as any value or figure of merit which characterises or quantifies loss to the organisation arising from operational processes being disabled.

A module 6 (hereinafter referred to as a "threat analyser") samples incoming traffic 4 and identifies threats using a list 7 of known threats stored in a database 8. For example, the module 6 may be a computer system running SNORT (for example release 2.6.0.1) available from www.snort.org.

The threat analyser 6 produces observed threat data 9, which includes a list of observed threats and their frequency of occurrence, and stores the data 9 in a database 10.

In some embodiments of the present invention, a system 11 for assessing threat uses models threats to the corporate network 1 so as to predict loss 12 arising from these threats and/or to provide feedback 13 to the firewall 3.

Each observed threat is defined using an identifier, a name, a description of the threat, a temporal profile specifying frequency of occurrence of the threat, a target (or targets) for the threat and a severity score for the (or each) target.

The identifier (herein the attribute "Threat ID" is used) uniquely identifies a threat. The Threat ID may be string of up to 100 characters. For example, the Threat ID may be "Win32.Word.B32 m".

The target ("Target") is a system category attacked by the threat. Targets are preferably named in a systematic way. Examples of targets include "Windows.XP" or "Oracle.9i". Targets can be identified at different levels using a format "system.version[-system.version[-system.version]]". For example, if a threat attacks Oracle running on Windows XP, then the target may be specified as "Oracle.9i-Windows.XP".

A system category may depend on other categories. For example, a company may have a system which depends on Windows Server 2003 and another system which depends on Windows XP, i.e. two different system categories. Thus, if a threat attacks more than one category, such as all versions of Windows, this can be handled by introducing a third system category, such as Windows, on which both of the other categories, in this example Windows Server 2003 and Windows XP, depend.

The severity score ("SeverityScore") is a measure of the impact of a successful threat. It is not a measure of the prevalence or exposure to the threat, but rather an indication of the damage that would be caused to the target system. Severity score may also be referred to as "damage level". In this example, the severity score is a value lying in a range between 1 and 10. For example, a value of 1 can represent trivial impact and a value of 10 may represent a catastrophic effect. However, the severity score may be defined as "low", "medium", "high" or "critical".

The temporal profile is used to describe frequency of occurrence of a threat because loss caused by system downtime may vary according to the time of the week. The temporal profile may be visible to and/or editable by a user for some types of threat, such as physical threats, and may be implicit and/or fixed for other types of threat, such as that defined in SNORT data.

The profile is expressed as a sequence of elements, each of which has a time block and a count of the observed occurrences of the threat during the block. Threat occurrences are preferably aggregated as far as possible to provide a simple profile whilst remaining consistent with recorded instances. A more complex profile can be used if the simple profile significantly deviates from recorded instances. For example, if a threat is observed only a very small number of times, then it is appropriate to specify a uniform time profile. However, if a different threat is observed many times and always, for example, on a Monday morning, then a more complex profile reflecting the actual distribution may be used.

Herein the temporal profile is defined in terms of day (attribute "Day"), period of day ("From", "To") and frequency ("Count").

Time blocks need not be same for different threats, although, for any given threat, blocks should do not overlap. If a part of a week is not covered by a block, threat occurrence is assumed to be zero.

The observed threat data is stored as a single file in Extensible Markup Language (XML) format encoded using 8-bit Unicode Transformation Format (UTF) as shown in the following simple example:

```xml
<?xml version="1.0" encoding="utf-8" ?>
<AssessmentSystem Version ="1">
    <ObservedThreats ObservationStart="2006-07-31T00:00:00"
                ObservationEnd="2006-08-07T00:00:00">
        <Threat ID="Win32.Worm.B32m" Target="Windows.XP" SeverityScore="4">
            <Observation From="00:00:00" To ="12:00:00" Count="8"/>
            <Observation From="12:00:00" To="00:00:00" Count="1"/>
        </Threat>
        <Threat ID="Linux.Trojan.A12s" Target="Oracle.9i" SeverityScore="6">
            <Observation Day="Monday" Count="50"/>
            <Observation Day="Tuesday Wednesday" Count="23"/>
            <Observation Day="Thursday Friday Saturday" Count="11"/>
            <Observation Day="Sunday" Count="0"/>
        </Threat>
        <Threat ID="DenialOfService" Target="IIS" SeverityScore="2">
            <Observation Day="Sunday" From="00:00:00" To="08:00:00" Count="1154"/>
            <Observation Day="Sunday" From="08:00:00" To="16:30:00" Count="237"/>
            <Observation Day="Monday" To="12:00:00" Count="350"/> <!--From is 00:00:00-->
            <Observation Day="Monday" From="12:00:00" Count="208"/> <!--To is 00:00:00-->
            <Observation Day="Tuesday Wednesday Thursday Friday Saturday" Count="2134"/>
        </Threat>
    </ObservedThreats>
</ AssessmentSystem >
```

In the example just given, three different types of observed threat are specified, namely a virus "Win32.Worm.B32 m", a Trojan "Linux.Trojan.A12s" and a denial-of-service attack "DenialOfService". However, it will be appreciated that there may be many more observed threats, e.g. tens or hundreds of thousands of threats or more.

Figure 2:
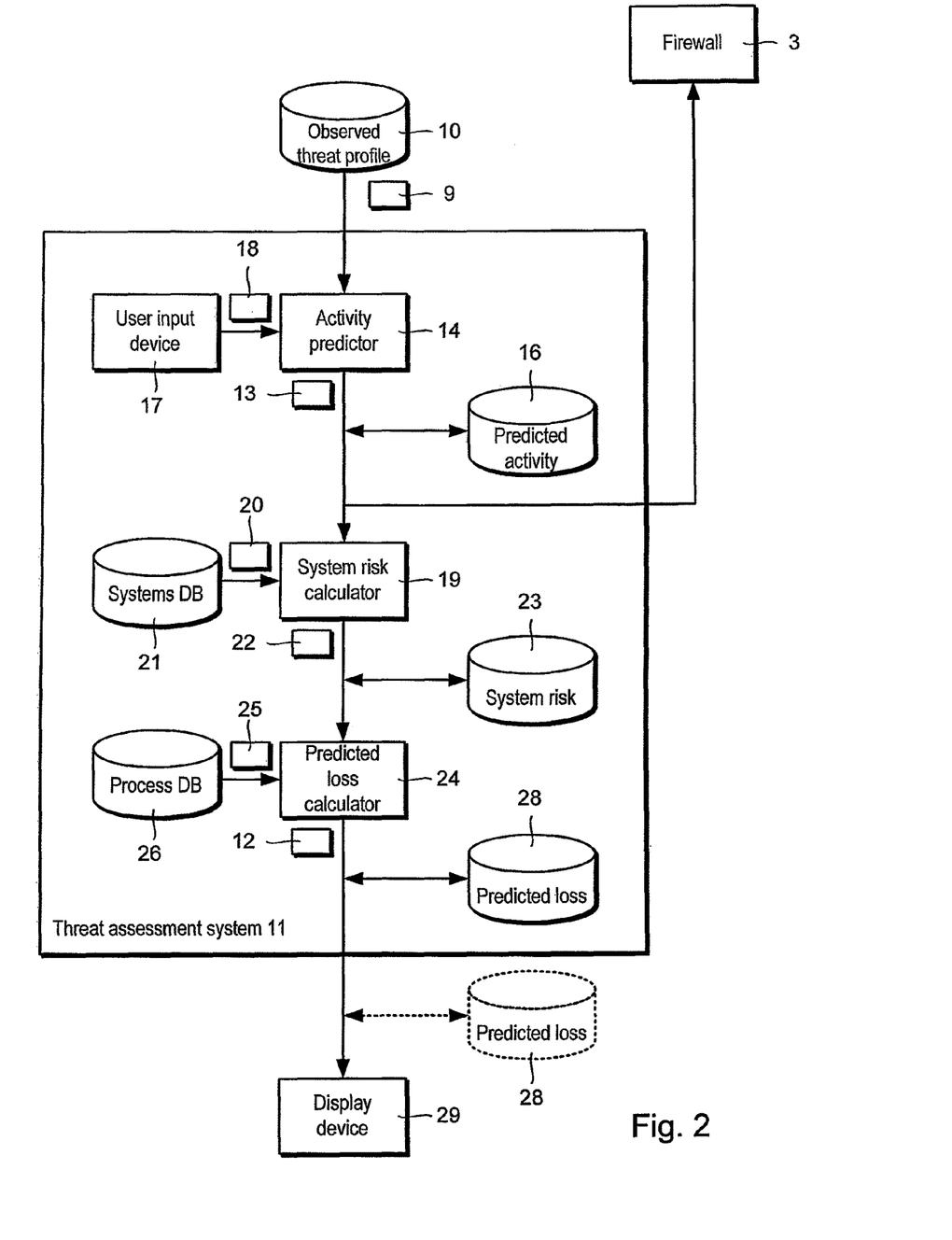
FIG. 2 is a detailed schematic diagram of the system for assessing threat to a computer network shown in FIG. 1.

Referring to FIG. 2, the threat assessment system 11 includes a first module 14 (hereinafter referred to as an "activity predictor") for predicting threat activity affecting the corporate network 1.

The activity predictor 14 receives the observed threat data 9 from the database 10, for example by retrieving the data automatically or in response to user instruction, extrapolates future event frequency and produces a profile 13 of predicted threat activity, which includes a list of predicted threats and their expected frequency of occurrence. The predicted threat activity profile 13 may be stored in a database 16.

Event frequency can be extrapolated from the historical data using a variety of editable factors which can be based upon advice from security consultants, political factors and so on.

Each predicted threat is defined using an identifier, a name, a description, a frequency of occurrence, a category (or categories) of system attacked and a corresponding damage level for each system.

A user, via input device 17, can manually add information 18 about other electronic and non-electronic forms of threat so that it can be added to the predicted threat activity profile 13.

Non-electronic forms of threat include, for example, fire, flood and terrorism attack. Information about non-electronic forms of attack is arranged in a similar way to information about electronic forms of threat and include, for each threat, an identifier, a name, a description and frequency of occurrence, categories of system attacked and corresponding damage levels.

The user can also provide or edit information about threat. For example, they can specify data regarding, extrapolation factors, the IT systems subject to attack, such as its identity, name and category identity, systems categories, such as its identity and name, operational processes, such as its identity, name and value, and process dependencies, such as process identity, system identity, dependency description and dependency level.

As shown in FIG. 2, the predicted threat activity profile 13 can be fed back to the firewall 3 to tune its operation.

The threat assessment system 11 includes a second module 19 (hereinafter referred to as a "system risk calculator") for calculating system risk.

The system risk calculator 19 receives the predicted threat activity profile 13 (either from the activity predictor 14 or the database 16) and information 20 about the IT systems 30 (FIG. 3) and the categories to which they belong from a systems database 21 and produces a risk profile 22 to the systems 30 (FIG. 3) in terms of predicted average downtime over a given period, usually specified to be a year. The risk 22 can be stored in database 23.

Each IT system 30 (FIG. 3) is defined by identity and a name. System categories, i.e. targets, may include operating systems, applications and server location.

An IT system may be defined in terms of physical location. This may be used to identify threats to some types of threat, such as fire, flooding, terrorism, power loss and so on.

The system 11 includes a third module 24 (hereinafter referred to as a "predicted loss calculator") for predicting the loss to the organisation.

The predicted loss calculator 24 receives the system risk 22 and data 25 listing operational processes from a database 26, then predicts the loss for each operational process, aggregates the results for each process and outputs predicted loss data 12. The predicted loss data 12 may be stored in database 28 and/or output on display device 29.

Each process is defined by identity and a name, value in terms of the cost of downtime. The dependency of each process on an underlying IT system is defined by process identity, system identity, dependency description and dependency level.

Referring also to FIG. 3, the predicted loss calculator 24 considers the system risk 22 for the IT systems 30, $30_1$, $30_2$, $30_3$, $30_4$, ..., $30_n$ on which each process 31, $31_A$, $31_B$, $31_C$, $31_D$, $31_E$, ..., $31_m$, depends via dependencies 32 and the value of the process and aggregates values $12_A$, $12_B$, $12_C$, $12_D$, $12_E, \ldots, 12_m$, for each process so as to produce a value $12_{SUM}$ for all processes. The predicted loss calculator 24 applies the system risk 22 to system categories 33, $33_\alpha$, $33_\beta$, $33_\chi$, ..., $33_\zeta$ which are related to the systems 30, $30_1$, $30_2$, $30_3$, $30_4$, ..., $30_n$ by dependencies 34 and the considers how the risk affects each IT system 30, $30_1$, $30_2$, $30_3$, $30_4$, ..., $30_n$.

In FIG. 3, only one level or layer of system category 33 is shown for clarity. However, as will be explained in more detail, there may be additional levels of system category 33 such that one or more system categories 33 in a lower level may depend on a system category in a higher level. Thus, a system 30 may depend on one or more system categories 33, which may arranged in one or more layers.

For example, a system category 33 in a higher level may be Windows and system categories 33 in a lower level may be Windows Server 2003 and Windows XP. A system 30 may be a corporate server which depends on Windows Server 2003 and another system 30 could be desktop computer which depends on Windows XP.

System categories 33 may be omitted and so threats to systems 30 may be considered directly.

The threat assessment system 11 can output a report of the predicted loss, e.g. an aggregate value at risk, to the organisation for each process in terms of process name, estimated annual downtime and predicted loss. For example, the report can be shown on the display device 29, for example, as a bar chart of predicted loss for each process and can be exported as a database file, such as an Microsoft® Excel® file (e.g., with an ".xls" extension) or in eXtensible Markup Language file, (e.g., with an ".xml" extension).

Figure 4:
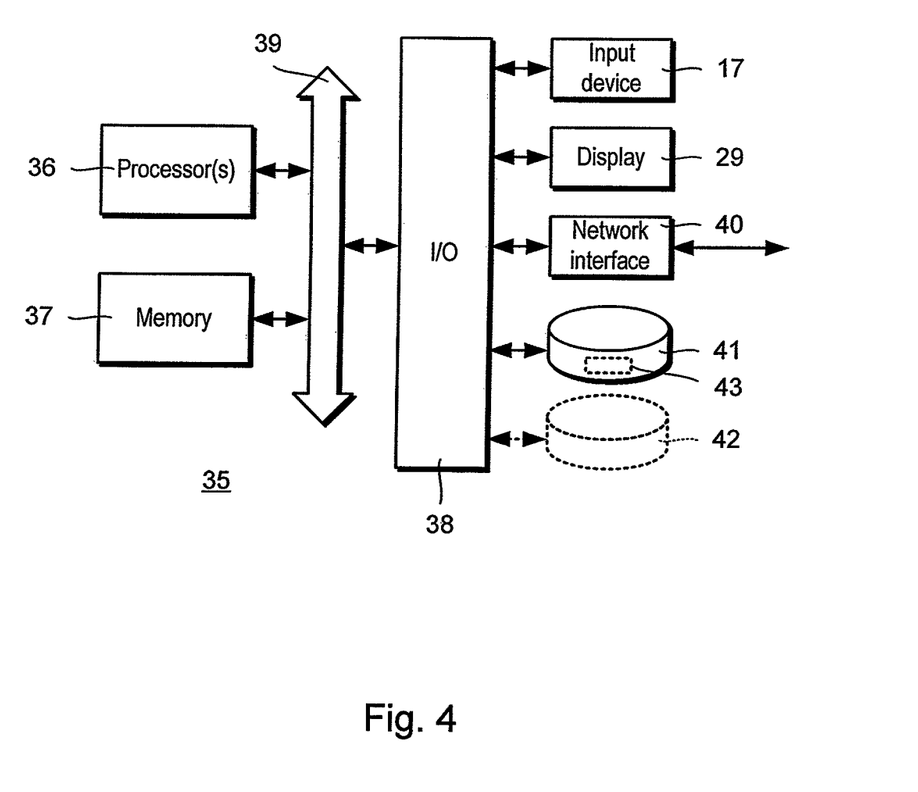
FIG. 4 is a schematic block diagram of a computer system providing threat assessment.

Referring to FIG. 4, the threat assessment system 11 (FIG. 2) is implemented in software on a computer system 35 running an operating system, such as Windows, Linux or Solaris. The computer system 35 includes at least one processor 36, memory 37 and an input/output (I/O) interface 38 operatively connected by a bus 39. The I/O interface 38 is operatively connected to the user input 17 (for example in the form of a keyboard and pointing device), display 29, a network interface 40, storage 41 in the form of hard disk storage and removable storage 42.

Computer program code 43 is stored in the hard disk storage 38 and loaded into memory 37 for execution by the processor(s) 36 to provide the modules 14, 19, 24. The computer program code 43 may be stored on and transferred from removable storage 42 or downloaded via the network interface 42 from a remote source (not shown).

The threat assessment system 11 generally has two modes of operation to meet different operational criteria.

In a "live mode", the activity predictor 14 periodically, for example daily, connects to the known threat database 10 (which is preferably continuously updated), retrieves the observed threat profile 9 and produces a new predicted activity 13. The predicted activity 13 is fed back to the firewall 3.

In an "analysis mode", a snapshot of the observed threat profile 9 is taken, predicted loss is assessed and a report produced.

Operation of the threat assessment system 11 will now be described in more detail.

The threat assessment system 11 uses an activity prediction process to extrapolate series of numbers in several places to find the next value in the series. In this example, weighted linear extrapolation is used, although other methods may be used, such as polynomial extrapolation.

Weighted linear extrapolation involves fitting a straight line y=mx+c through supplied data, finding values for the parameters m and c, and then using these parameters to find a value for y corresponding to a value of x beyond the range of that data.

A so-called "best fit" line is the one which is as close to as many of the supplied data points as possible. The closeness at a single point $x_i$ is given by the residual $r_i$, namely:

$$r_i = y_i - (mx_i + c) \tag{1}$$

The overall quality of fit is given by the summed square of all the residuals, each weighted by the corresponding weighting factor:

$$S' = \sum_{i=1}^{n} w_i(y_i - (mx_i + c))^2. \tag{2}$$

The best fit line is found by minimising S' with respect to m and c.

The minimum may be found by differentiating S' with respect to m and c.

$$\frac{\partial S'}{\partial m} = -2\sum wx(y - (mx + c)) \tag{3}$$

$$\frac{\partial S'}{\partial c} = -2\sum w(y - (mx + c)) \tag{4}$$

where the summations are from 1 to n for w, x and y.

The minimum is found where the differentials are 0, therefore:

$$\sum wx(y-(mx+c))=0 \tag{5}$$

$$\sum w(y-(mx+c))=0 \tag{6}$$

$$\sum wxy - m\sum wx^2 - c\sum wx = 0 \tag{7}$$

$$\sum wy - m\sum wx - c\sum w = 0 \tag{8}$$

Equation (8) may be re-arranged to find c:

$$c = \frac{\sum wy - m\sum wx}{\sum w} \tag{9}$$

and, by substitution, m can be found:

$$m = \frac{\sum w \sum wxy - \sum wx \sum wy}{\sum w \sum wx^2 - (\sum wx)^2} \tag{10}$$

Analogously, $$m = \frac{\sum wy - c\sum w}{\sum wx} \tag{11}$$

$$\sum wxy - \frac{\sum wx^2}{\sum wx}\left(\sum wy - c\sum w\right) - c\sum wx = 0 \quad (12)$$

$$\sum wx \sum wxy - \sum wx^2 \sum wy = c\left(\left(\sum wx\right)^2 - \sum w \sum wx^2\right) \quad (13)$$

$$c = \frac{-\sum wx \sum wxy + \sum wx^2 \sum wy}{\sum w \sum wx^2 - \left(\sum wx\right)^2} \quad (14)$$

Given m and c from the formulae above, the series may be extrapolated to point n+1:

$$y_{n+1} = mx_{n+1} + c \quad (15)$$

Referring to FIGS. 1 to 4, 5A and 5B, and operation of the activity predictor 14 will be described in more detail.

Figure 5A:
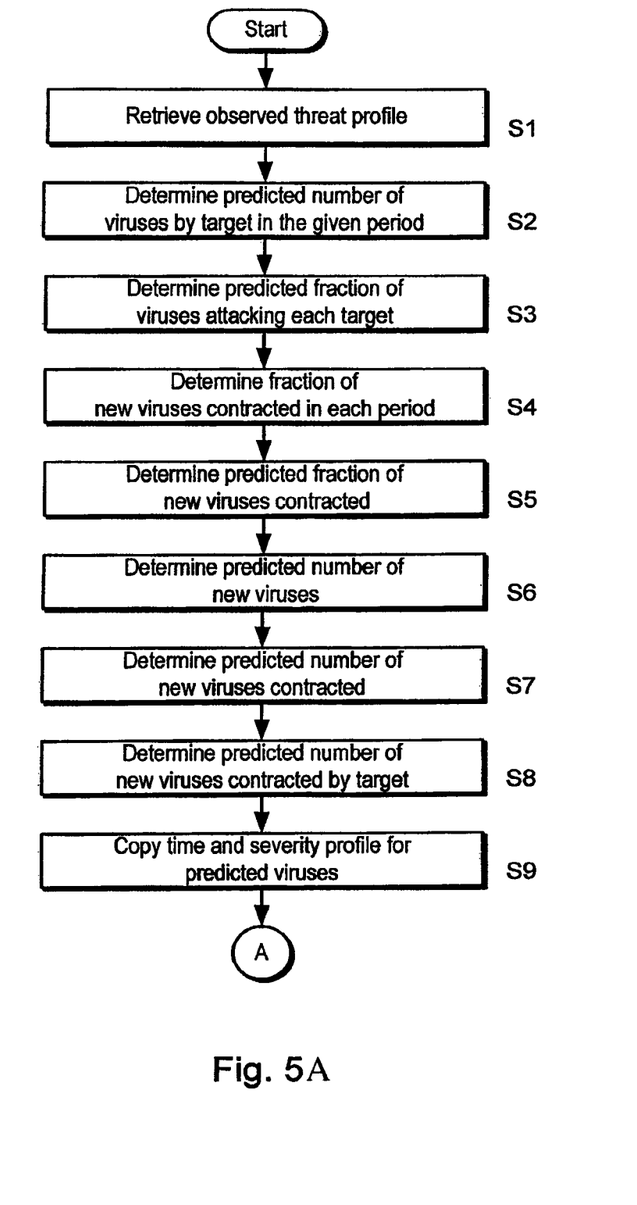
FIGS. 5A and 5B are a process flow diagram of a method of predicting threat activity.
Figure 5B:
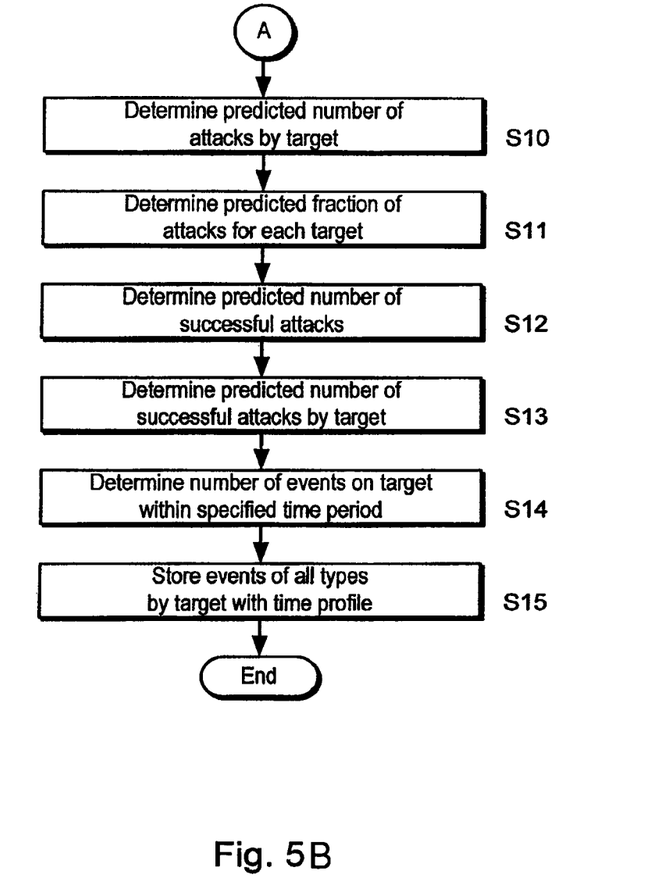

The activity predictor 14 retrieves the observed threat data 9 from the observed threat database 10 (step S1) and sets about determining a time profile for each target, each time profile defined in terms of one of more time blocks and the number of successful threats expected in each time block (steps S2 to S13).

In this example, threats are generally divided into three categories, namely malicious codes (e.g. viruses, Trojans and worms), attacks (e.g. hacking and denial-of-service attacks) and non-electronic forms of attack (e.g. fire and terrorist attacks). Fewer categories may be defined, for example, by excluding non-electronic forms of attack. However, additional categories or sub-categories may be defined or added, for example as new forms of threat emerge. It will be appreciated that these threats can be assessed in any order and may even be evaluated simultaneously, for example, if a multi-core computer system 35 is used.

Equations (9), (10) and (15) and/or (13), (14) and (15) above are used to predict the number of viruses (or other forms of malicious code) using input data specified in Table I below:

TABLE I

| Item | Source | Symbol |
| --- | --- | --- |
| Number of viruses seen by target t and period p | SNORT | $obs_{t/p}^v$ |
| Number of viruses contracted by period p | User | $contr_p^v$ |
| Number of new viruses worldwide by period p | www.wildlist.org | $new_p^v$ |

The number of viruses seen by a target in a period, $obs_{t/p}^v$, is obtained from the threat analyser 6 running SNORT (or other intrusion detection program). The number of viruses contracted in the given period of time, $contr_p^v$, is specified, via input device 17, by the user. The number of new viruses worldwide in a period, $new_p^v$, is obtained from a virus (or other malicious software) information gathering organisation, such as The Wildlist Organization (www.wildlist.org). The period, p, may be, for example, one week or four weeks. However, other periods, such n-weeks or n-months may be used, where n is positive integer.

The activity predictor 14 takes the number of viruses seen by a target for a given period of time, $obs_{t/p}^v$ and extrapolates the observed viruses to give the predicted number of viruses by target in the given period, $pred_p^v$ (step S2). The value for each target will be used to calculate the number of viruses expected to be contracted by the target.

The activity predictor 14 normalizes the predicted number of viruses by target in the given period, $pred_p^v$, to give a predicted fraction of viruses attacking each target, frac $pred_t^v$, by dividing the predicted number, $pred_t^v$ by the total number of new malicious codes which have been observed over the same period (step S3).

Steps S2 and S3 can be summarised as follows:

$$obs_{t/p}^v \xrightarrow{extrapolate} pred_t^v \xrightarrow{normalise} frac\ pred_t^v$$

The activity predictor 14 divides the number of viruses contracted in each period, $contr_p^v$ by the number of new viruses worldwide in that period, $new_p^v$, to give the fraction of new viruses contracted in each period, frac $contr_p^v$ (step S4). The activity predictor 14 extrapolates this value to give the predicted fraction of new viruses that will be contracted, pred frac $contr^v$ (step S5).

Steps S4 and S5 can be summarised as follows:

$$\frac{contr_p^v}{new_p^v} = frac\ contr_p^v \xrightarrow{extrapolate} pred\ frac\ contr^v$$

The activity predictor 14 extrapolates the number of new viruses, $new_p^v$, to give a predicted number of new viruses (step S6), i.e.:

$$new_p^v \xrightarrow{extrapolate} pred\ new^v$$

The activity predictor 14 multiplies the predicted fraction of new viruses that will be contracted, pred frac $contr^v$, by the number of new viruses, $new_p^v$, to give the predicted number of new viruses contracted, pred $contr^v$ (step S7), i.e.:

$$pred\ contr^v = pred\ frac\ contr^v \times pred\ new^v$$

The activity predictor 14 multiplies the fraction of viruses for each target, frac $pred_t^v$, by the predicted number of viruses contracted, pred $contr^v$, to give the predicted number of viruses contracted by target, pred $contr_t^v$ (step S8), namely:

$$pred\ contr_t^v = frac\ pred_t^v \times pred\ contr^v$$

Finally, the activity predictor 14 copies the time and severity profile for predicted viruses contracted directly from $obs_{t/p}^v$ (step S9). For example, for each instance of a virus, the identity of the virus together with its time profile and severity profile is added to a table. This provides the predicted number of viruses contacted by target with time profile.

The activity predictor 14 uses equations (9), (10) and (15) and/or (13), (14) and (15) to carry out a similar process for predicting the number of hacking, denial-of-service attacks and other similar forms of attack, using input data specified in Table II below, using the following steps:

TABLE II

| Item | Source | Symbol |
|---|---|---|
| Number of attacks seen by target t and period p | SNORT | $\text{obs}_{t/p}^{a}$ |
| Number of successful attacks by period p | User | $\text{contr}_{p}^{a}$ |

The activity predictor 14 extrapolates observed attacks, $\text{obs}_{t/p}^{a}$, to give predicted number of attacks by target, $\text{pred}_{t}^{a}$ (step S10) and normalizes this to give predicted fraction of attacks attacking each target, $\text{frac pred}_{t}^{a}$ (step S11).

Steps S10 and S11 can be summarised as follows:

$$\text{obs}_{t/p}^{a} \xrightarrow{\text{extrapolate}} \text{pred}_{t}^{a} \xrightarrow{\text{normalise}} \text{frac pred}_{t}^{a}$$

The activity predictor 14 extrapolates the number of successful attacks to give the predicted number of successful attacks, $\text{pred contr}^{a}$ (step S12), i.e.:

$$\text{contr}_{p}^{a} \xrightarrow{\text{extrapolate}} \text{pred contr}^{a}$$

The activity predictor 14 multiplies the predicted number of successful attacks, $\text{pred contr}^{a}$, by predicted fraction of attacks attacking each target, $\text{frac pred}_{t}^{a}$, to give the predicted number of successful attacks by target (step S13), i.e.

$$\text{pred contr}_{t}^{a} = \text{frac pred}_{t}^{a} = \text{pred contr}^{a}$$

The activity predictor 14 copies time and severity profile for predicted successful attacks directly from $\text{obs}_{t/p}^{v}$.

For non-electronic threats, the user can provide the expected number of disabling events on the target with a given time profile (step S14).

The activity predictor 14 stores the expected number of malicious codes, attacks and disabling events in the predicted threat activity profile 13 (step S15).

Referring to FIGS. 1 to 4 and 6, operation of the system risk calculator 19 will now be described in more detail.

Figure 6:
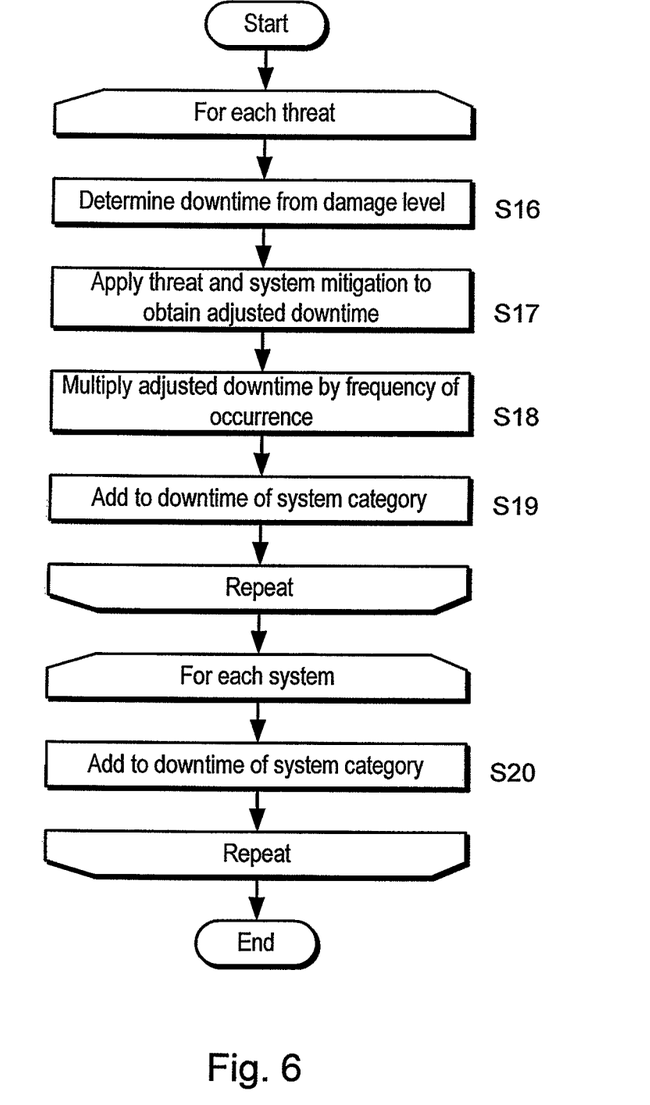
FIG. 6 is a process flow diagram of a method of calculating system risk.

For each threat, the risk calculator 19 carries out the following steps, namely steps S16 to S19.

The risk calculator 19 determines downtime for a system category 33, i.e. a target, based on the expected damage level for the successful threat (step S16). In this example, this is done using the value of the attribute "SeverityScore" using a look-up table giving a downtime for each SeverityScore for each system category. The risk calculator 19 can adjust the downtime, for example by taking into account mitigating factors, such as whether the system can operate in a safe mode and whether back-up systems are available (step S17). The risk calculator 19 multiplies each adjusted downtime by the frequency of occurrence of the successful threat to obtain a value of the total downtime for the threat (step S18). The risk calculator 19 then adds the downtime to an accumulated downtime for the system category (step S19).

For each system 30, the risk calculator 19 adds up downtimes of dependencies of the system categories 33 on which the system 30 depends and, if appropriate, dependencies of the system categories on which those system dependencies depend (step S20). Circular dependencies among categories may be forbidden.

Referring to FIGS. 1 to 4 and 7, operation of the predicted loss calculator 24 will now be described in more detail.

Figure 7:
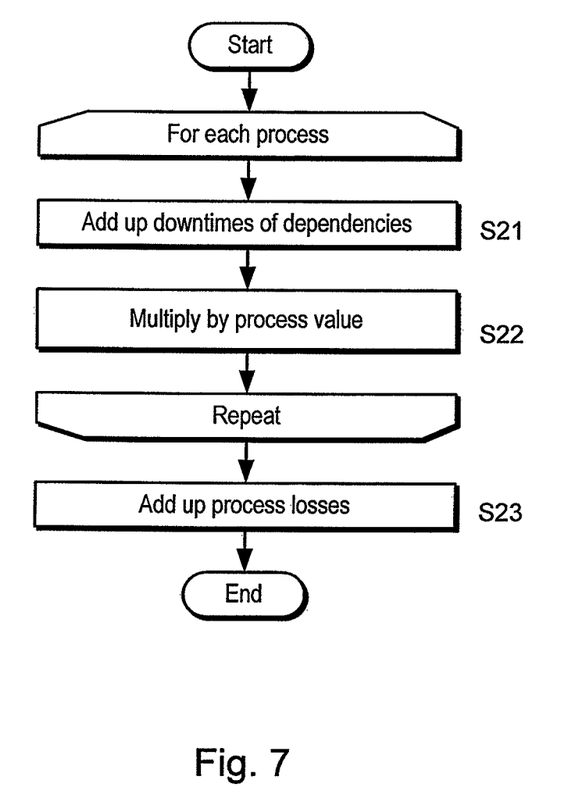
FIG. 7 is a process flow diagram of a method of calculating predicted loss.

For each operational process, the predicted loss calculator 24 adds up predicted downtimes of the system categories on which it depends to determine a duration for which the process is unavailable (step S21). The predicted loss calculator 24 multiplies the duration by a value of the process to quantify the loss 12$_{A}$, 12$_{B}$, 12$_{C}$, 12$_{D}$, 12$_{E}$, ..., 12$_{m}$ for the process (step S22). For example, the value of the process may be a monetary value (e.g. given in pounds sterling per hour or dollars per day) and the loss may be value at risk for the process.

Once losses 12$_{A}$, 12$_{B}$, 12$_{C}$, 12$_{D}$, 12$_{E}$, ..., 12$_{m}$ for each process have been determined, the predicted loss calculator 24 adds the losses 12$_{A}$, 12$_{B}$, 12$_{C}$, 12$_{D}$, 12$_{E}$, ..., 12$_{m}$ for all the processes to obtain a loss to the organisation (step S23).

The loss 12$_{A}$, 12$_{B}$, 12$_{C}$, 12$_{D}$, 12$_{E}$, ..., 12$_{m}$ for each process and the loss 12$_{SUM}$, to the organisation can be stored in database 28 and/or exported. As explained earlier, some or all of the losses 12$_{A}$, 12$_{B}$, 12$_{C}$, 12$_{D}$, 12$_{E}$, ..., 12$_{m}$, 12$_{SUM}$, can be displayed, for example as a bar chart, on display device 29.

It will be appreciated that many modifications may be made to the embodiments hereinbefore described.

The invention claimed is:

1. Apparatus for assessing threat to at least one computer network, the threat including at least one electronic threat, the computer network comprising a plurality of IT systems and a plurality of business processes operating on the plurality of IT systems, wherein (a) at least one IT system has two or more of the plurality of business processes operating thereon or (b) at least one business process operates on two or more of the plurality of IT systems, the apparatus comprising at least one processor and a memory coupled to the processor, the memory storing instructions executable by the processor that cause the processor to:

predict future threat activity based on past observed threat activity including, for the at least one electronic threat, to receive observed threat data from a database, to extrapolate future event frequency and to produce a profile of predicted threat activity, wherein the observed threat data includes observed threats and, for each observed threat, one or more targets for the observed threat and a severity score for each target, determine expected downtime of each system of the plurality of IT systems in dependence upon said predicted threat activity including the severity scores and extrapolated future event frequency, determine loss for each of the plurality of business processes dependent on the downtimes of the IT systems, and add losses for the plurality of business processes so as to obtain a combined loss arising from the threat activity.

2. The apparatus according to claim 1, wherein the instructions comprise:

a first module configured to determine the predicted threat activity including, for the at least one electronic threat, to receive observed threat data from a database, to extrapolate future event frequency and to produce a profile of predicted threat activity, wherein the observed threat data includes observed threats and, for each observed threat, one or more targets for the observed threat and a severity score for each target;

a second module configured to determine the expected downtime of each IT system of the plurality of IT systems in dependence upon said predicted threat activity including the severity scores and extrapolated future event frequency; and a third module configured to determine the loss for each of a plurality of business processes.

3. The apparatus according to claim 2, wherein the third module is configured to add the losses for the plurality of business processes.

4. The apparatus according to claim 1, wherein the apparatus is further configured to store at least one of the losses and the combined loss in a storage device.

5. The apparatus according to claim 1, wherein the apparatus is configured to display at least one of the losses and the combined loss on a display device.

6. The apparatus according to claim 1, further configured to output the predicted threat activity to a firewall.

7. The apparatus according to claim 1, wherein loss is value at risk.

8. The apparatus according to claim 1, wherein the observed list of threats includes, for each threat, information identifying at least one system.

9. The apparatus according to claim 1, wherein the observed list of threats includes, for each threat, information identifying frequency of occurrence of the threat.

10. The apparatus according to claim 9, wherein the frequency of occurrence of the threat includes at least one period of time and corresponding frequency of occurrence for the at least one period of time.

11. The apparatus according to claim 1 wherein the plurality of IT systems include a plurality of software systems.

12. A method of assessing threat to at least one computer network, the threat including at least one electronic threat, the network comprising a plurality of IT systems wherein a plurality of business processes operate on the plurality of IT systems, and wherein (a) at least one IT system has two or more of the plurality of business processes operating thereon or (b) at least one business process operates on two or more of the plurality of IT systems, the method comprising, by using at least one computer processor:

predicting threat activity based on past observed activity including, for the at least one electronic threat, to receive observed threat data from a database, to extrapolate future event frequency and to produce a profile of predicted threat activity, wherein the observed threat data includes observed threats and, for each observed threat, one or more targets for the observed threat and a severity score for each target;

determining expected downtime of the plurality of IT systems in dependence upon said predicted threat activity including the severity scores and extrapolated future event frequency;

determining loss for the plurality of business processes dependent on the downtimes of the IT systems;

adding losses for the plurality of business processes to obtain a combined loss arising from the threat activity.

13. The method according to claim 12, further comprising:
storing at least one of the losses and combined loss in a storage device.

14. The method according to claim 12, further comprising:
displaying at least one of the losses and combined loss on a display device.

15. A non-transitory computer readable medium storing a computer program which when executed by a computer system, causes the computer system to perform a method of assessing threat to at least one computer network, the threat including at least one electronic threat, the computer network comprising a plurality of IT systems wherein a plurality of business processes operate on the plurality of IT systems, and wherein (a) at least one IT system has two or more of the plurality of business processes operating thereon or (b) at least one business process operates on two or more of the plurality of IT systems, the method comprising:

predicting threat activity based on past observed activity including, for the at least one electronic threat, to receive observed threat data from a database, to extrapolate future event frequency and to produce a profile of predicted threat activity, wherein the observed threat data includes observed threats and, for each observed threat, one or more targets for the observed threat and a severity score for each target;

determining expected downtime of each of the plurality of IT systems in dependence upon said predicted threat activity including the severity scores and extrapolated future event frequency;

determining loss for the plurality of business processes dependent on the downtimes of the IT systems;

adding losses for the plurality of business processes to obtain a combined loss arising from the threat activity.

\* \* \* \* \*